(No Model.)

J. W. HYATT.
MANUFACTURE OF COMBS FROM CELLULOID AND OTHER PLASTIC MATERIAL.

No. 299,390. Patented May 27, 1884.

WITNESSES:
Herman Gustow
J. H. Chittow

INVENTOR
John W. Hyatt,
BY
Chas. C. Gill
ATTORNEY

United States Patent Office.

JOHN W. HYATT, OF NEWARK, NEW JERSEY, ASSIGNOR TO THE CELLULOID MANUFACTURING COMPANY, OF NEW YORK, N. Y.

MANUFACTURE OF COMBS FROM CELLULOID AND OTHER PLASTIC MATERIAL.

SPECIFICATION forming part of Letters Patent No. 299,390, dated May 27, 1884.

Application filed April 23, 1884. (No model.)

*To all whom it may concern:*

Be it known that I, JOHN W. HYATT, a citizen of the United States, and a resident of Newark, in the county of Essex and State of New Jersey, have invented certain new and useful Improvements in the Manufacture of Combs from Celluloid and other Plastic Material, of which the following is a specification.

The invention relates to improvements in the manufacture of combs from celluloid and other plastic material; and it consists in a novel method, hereinafter pointed out, whereby the entire comb may be completed at a single operation.

Figure 1:
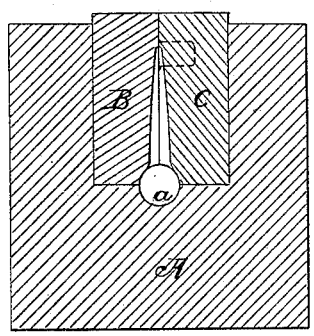
Figure 2:
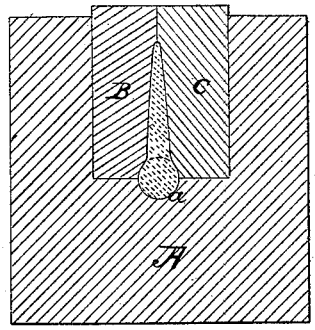
Figure 3:
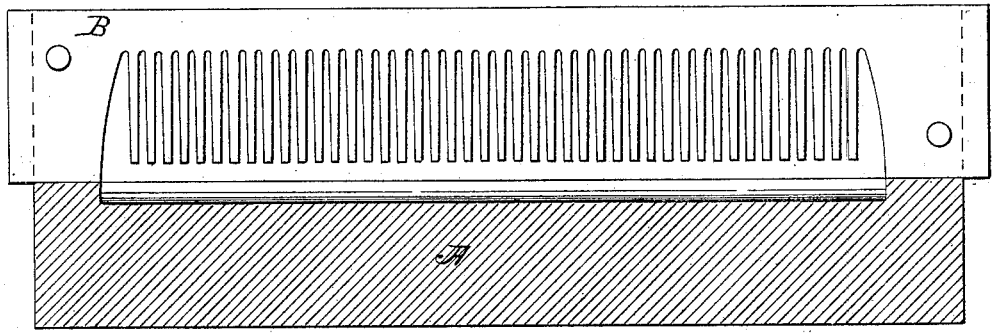

The invention is practiced in connection with a die or mold which I illustrate in the accompanying drawings, Figure 1 being a vertical transverse section through the same; Fig. 2, a similar view illustrating the material within the matrix; Fig. 3, a central vertical longitudinal section through the mold or die, and Fig. 4 a face and edge view of one of the pieces constituting a tooth of the comb.

The die consists of the parts A B C, the part A being recessed longitudinally to receive the parts B C, as indicated. In the base of the recess formed in the part A is cut the groove *a*, which will in practice conform to the contour of the lower half of the back of the comb. The parts B C divide centrally above the groove *a*, and in the meeting faces of said parts are cut the parts of the matrix to form the teeth and adjoining half of the back of the comb, as indicated in Fig. 3. The parts of the matrix in which the teeth are formed will be of appropriate contour, and gradually taper outward from their point toward and merge into the groove in which the back of the comb is formed.

Figure 4:

In the operation of forming a comb by the apparatus above described I first place a rod of the plastic material in the groove *a*, and then place the two parts B C of the die together, and insert small pieces (such as illustrated in Fig. 4) of the material into each of the matrices therein, after which said parts B C are inserted into the press formed in the part A, whereby the ends of the pieces of the material in the said matrices are brought in contact with the rod previously placed in the groove *a*. Heat and pressure being applied, the small pieces of the material in the matrices of the parts B C will be formed into teeth for the comb, and will be welded to the rod in the groove *a*, which will constitute the back of the comb. The teeth and back of the comb weld together perfectly, and when the base of the teeth spread laterally toward the sides of the back, as indicated in Fig. 2, the comb will be strong and durable and have a highly finished appearance. The form of the groove *a* may be varied at will, according to the formation it is desired to give to the back of the comb, and the matrices in the parts B C will be arranged to produce teeth of the desired outline. Upon the removal of the comb from the die it may be treated on a buffing-wheel or otherwise, as may be desired, to complete it for the market.

What I claim as my invention, and desire to secure by Letters Patent, is—

1. The method hereinbefore described of manufacturing combs of plastic material, which consists in providing strips approximating to the size of the teeth of the comb and welding them to a piece of the material of suitable dimensions to constitute the back of the comb, substantially as set forth.

2. The method hereinbefore described of manufacturing combs of plastic material, which consists in providing strips approximating to the teeth and a rod approximating to the back of the comb, and welding the whole together at a single operation, substantially as set forth.

3. The apparatus hereinbefore described, composed of the recessed part A, having the groove *a*, and the corresponding parts, B C, in which are formed the matrices for the teeth of the comb, substantially as set forth.

Signed at New York, in the county of New York and State of New York, this 15th day of April, A. D. 1884.

JOHN W. HYATT.

Witnesses:
CHAS. C. GILL,
HERMAN GUSTOW.